US012583356B2

(12) United States Patent
Murata et al.

(10) Patent No.: US 12,583,356 B2
(45) Date of Patent: Mar. 24, 2026

(54) BATTERY EXCHANGE GUIDING METHOD AND BATTERY EXCHANGE SYSTEM

(71) Applicant: TOYOTA JIDOSHA KABUSHIKI KAISHA, Toyota (JP)

(72) Inventors: Soshiro Murata, Toyota (JP); Hiroshi Umeno, Nisshin (JP); Takahiro Nomura, Okazaki (JP); Yuya Onozuka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 74 days.

(21) Appl. No.: 18/512,887

(22) Filed: Nov. 17, 2023

(65) Prior Publication Data

US 2024/0181921 A1 Jun. 6, 2024

(30) Foreign Application Priority Data

Dec. 5, 2022 (JP) ................................. 2022-194343

(51) Int. Cl.
B60L 53/80 (2019.01)
B60L 53/62 (2019.01)
B60L 58/13 (2019.01)

(52) U.S. Cl.
CPC .............. B60L 53/80 (2019.02); B60L 53/62 (2019.02); B60L 58/13 (2019.02); *B60L 2260/52* (2013.01); *B60L 2260/54* (2013.01)

(58) Field of Classification Search
CPC .......... B60L 53/80; B60L 53/62; B60L 58/13; B60L 2260/52; B60L 2260/54
See application file for complete search history.

(56) References Cited

U.S. PATENT DOCUMENTS

| | | | |
|---|---|---|---|
| 2009/0082957 A1 | 3/2009 | Agassi et al. | |
| 2019/0178663 A1 | 6/2019 | Mukai et al. | |
| 2020/0386561 A1* | 12/2020 | Namiki | ................... B60L 53/80 |

FOREIGN PATENT DOCUMENTS

| | | |
|---|---|---|
| EP | 3951690 A1 | 2/2022 |
| JP | 2014-135892 A | 7/2014 |
| JP | 2020-190480 A | 11/2020 |
| WO | 2010/005052 A2 | 1/2012 |
| WO | 2018/061415 A1 | 4/2018 |

* cited by examiner

*Primary Examiner* — Hitesh Patel
*Assistant Examiner* — Joshua Jeffrey Penko
(74) *Attorney, Agent, or Firm* — Dinsmore & Shohl LLP

(57) ABSTRACT

A battery exchange guiding method includes: searching for a battery station that an electrically powered vehicle is able to reach (first searching); and searching for the battery station in which a battery with a larger SOC than a predetermined value (an SOC required to reach a destination from the battery station+a user's desired value in regard to a remaining amount of the SOC at a timing of arrival at the destination) is stored (second searching). The guiding method includes notifying the user of the electrically powered vehicle of information on the battery station extracted through the above two searches.

7 Claims, 5 Drawing Sheets

PLEASE SELECT BATTERY STATION DISPLAYED WITH ●

BATTERY EXCHANGE GUIDING METHOD AND BATTERY EXCHANGE SYSTEM

CROSS REFERENCE TO RELATED APPLICATIONS

This nonprovisional application is based on Japanese Patent Application No. 2022-194343 filed on Dec. 5, 2022 with the Japan Patent Office, the entire contents of which are hereby incorporated by reference.

BACKGROUND

Field

The present disclosure relates to a battery exchange guiding method and a battery exchange system.

Description of the Background Art

Japanese Patent Laying-Open No. 2014-135892 discloses an electrically powered vehicle that identifies a battery service station that the electrically powered vehicle can reach on the basis of a battery charged state of the electrically powered vehicle and a position of the electrically powered vehicle.

SUMMARY

According to the electrically powered vehicle disclosed in Japanese Patent Laying-Open No. 2014-135892, there may be a case where it is difficult for the electrically powered vehicle to reach a destination depending on an SOC of a battery mounted in the electrically powered vehicle at the battery service station. It is desirable to prevent a difficulty in reaching the destination due to shortage of the SOC of the electrically powered vehicle after the battery exchange at the battery service station (battery exchange station).

The present disclosure was made in order to solve the problem, and an object thereof is to provide a battery exchange guiding method and a battery exchange system capable of preventing a difficulty in reaching a destination due to shortage of a state of charge (SOC) of an electrically powered vehicle after battery exchange at a battery exchange station.

A battery exchange guiding method according to a first aspect of the present disclosure includes: acquiring information on an SOC of a first battery mounted in an electrically powered vehicle; acquiring information on an SOC of a second battery stored in at least one battery exchange station; calculating a distance between the electrically powered vehicle and the battery exchange station; first searching for the battery exchange station that the electrically powered vehicle is able to reach, by using information on the distance and the information on the SOC of the first battery; second searching for the battery exchange station in which the second battery with a larger SOC than a predetermined value is stored, by using the information on the SOC of the second battery; and notifying a user of the electrically powered vehicle of information on the battery exchange station extracted through the first searching and the second searching.

According to the battery exchange guiding method of the first aspect of the present disclosure, the user of the electrically powered vehicle is notified of the information on the battery exchange station extracted through the first searching of searching for the battery exchange station that the electrically powered vehicle is able to reach and the second searching of searching for the battery exchange station in which the second battery with a larger SOC than the predetermined value is stored as described above. It is thus possible to prevent a second battery with an SOC that is the predetermined value or less from being mounted in the electrically powered vehicle. As a result, it is possible to prevent a difficulty in reaching a destination due to shortage of the SOC of the electrically powered vehicle. Moreover, it is possible to prevent the electrically powered vehicle from being brought into a power shortage state before reaching the battery exchange station, through the search in the first searching.

In some embodiments, the battery exchange guiding method according to the first aspect further includes: acquiring information on a destination of the electrically powered vehicle; and calculating an SOC required to reach the destination from the battery exchange station. The second searching includes searching for the battery exchange station in which the second battery is stored, the second battery being charged to more than or equal to the SOC required to reach the destination from the battery exchange station. With such a configuration, it is possible to prevent the SOC of the second battery from becoming zero before arrival at the destination. As a result, it is possible to further prevent a difficulty in reaching the destination due to shortage of the SOC of the electrically powered vehicle.

In some embodiments, in this case, acquiring a desired value of the user in regard to an SOC of the electrically powered vehicle which remains at a timing when the electrically powered vehicle reaches the destination is further included. The second searching includes searching for the battery exchange station in which the second battery is stored, the second battery being charged to more than or equal to a total value of the SOC required to reach the destination from the battery exchange station and the desired value. With such a configuration, it is possible to prevent the SOC of the electrically powered vehicle from becoming smaller than the desired value at the timing when the electrically powered vehicle reaches the destination.

In some embodiments, the battery exchange guiding method according to the first aspect further includes: acquiring booking information of other electrically powered vehicles at the battery exchange station. The second searching includes searching for the battery exchange station in which the number of the second batteries with the SOC that is the predetermined value or more is larger than the number of the other electrically powered vehicles booking the battery exchange station. With such a configuration, it is possible to prevent the second battery with an SOC that is the predetermined value or more from becoming out of stock when the electrically powered vehicle changes the battery at the battery exchange station.

In some embodiments, in the battery exchange guiding method according to the first aspect, the electrically powered vehicle includes a display unit. The notifying a user includes (i) causing the display unit to display, in a first form, a position of the battery exchange station extracted through the first searching and the second searching and (ii) causing the display unit to display, in a second form that is different from the first form, a position of the battery exchange station that is not extracted in the first searching and the second searching. With such a configuration, it is possible for the user of the electrically powered vehicle to easily recognize the position of the battery exchange station extracted through the searching.

In some embodiments, in this case, the notifying a user includes causing the display unit to display the position of the battery exchange station extracted through the first searching and the second searching in a state where the display unit does not display the position of the battery exchange station that is not extracted through the first searching and the second searching. With such a configuration, it is possible for the user of the electrically powered vehicle to more easily recognize the position of the battery exchange station extracted through the searching.

In some embodiments, the battery exchange guiding method according to the first aspect further includes: encouraging the user to book the battery exchange station extracted through the first searching and the second searching or booking the battery exchange station extracted through the first searching and the second searching. With such a configuration, it is possible to prevent the battery exchange station extracted through the searching from being left in a state where the battery exchange station is not booked by the user.

A battery exchange system according to a second aspect of the present disclosure includes: an electrically powered vehicle in which a first battery is mounted; at least one battery exchange station in which a second battery is stored; and a control device that acquires information on an SOC of the first battery and information on an SOC of the second battery. The control device calculates a distance between the electrically powered vehicle and the battery exchange station, executes first search of searching for the battery exchange station that the electrically powered vehicle is able to reach, by using information on the distance and the information on the SOC of the first battery, executes second search of searching for the battery exchange station in which the second battery with a larger SOC than a predetermined value is stored, by using information on the SOC of the second battery, and performs control of notifying a user of the electrically powered vehicle of information on the battery exchange station extracted through the first search and the second search.

According to the battery exchange system of the second aspect of the present disclosure, the user of the electrically powered vehicle is notified of the information on the battery exchange station extracted through the first search of searching for the battery exchange station that the electrically powered vehicle is able to reach and the second search of searching for the battery exchange station in which the second battery with a larger SOC than the predetermined value is stored, by using information on the SOC of the second battery, as described above. It is thus possible to provide a battery exchange system capable of preventing a difficulty in reaching a destination due to shortage of the SOC of the electrically powered vehicle.

The foregoing and other objects, features, aspects and advantages of the present disclosure will become more apparent from the following detailed description of the present disclosure when taken in conjunction with the accompanying drawings.

DESCRIPTION OF THE EMBODIMENTS

Figure 1:
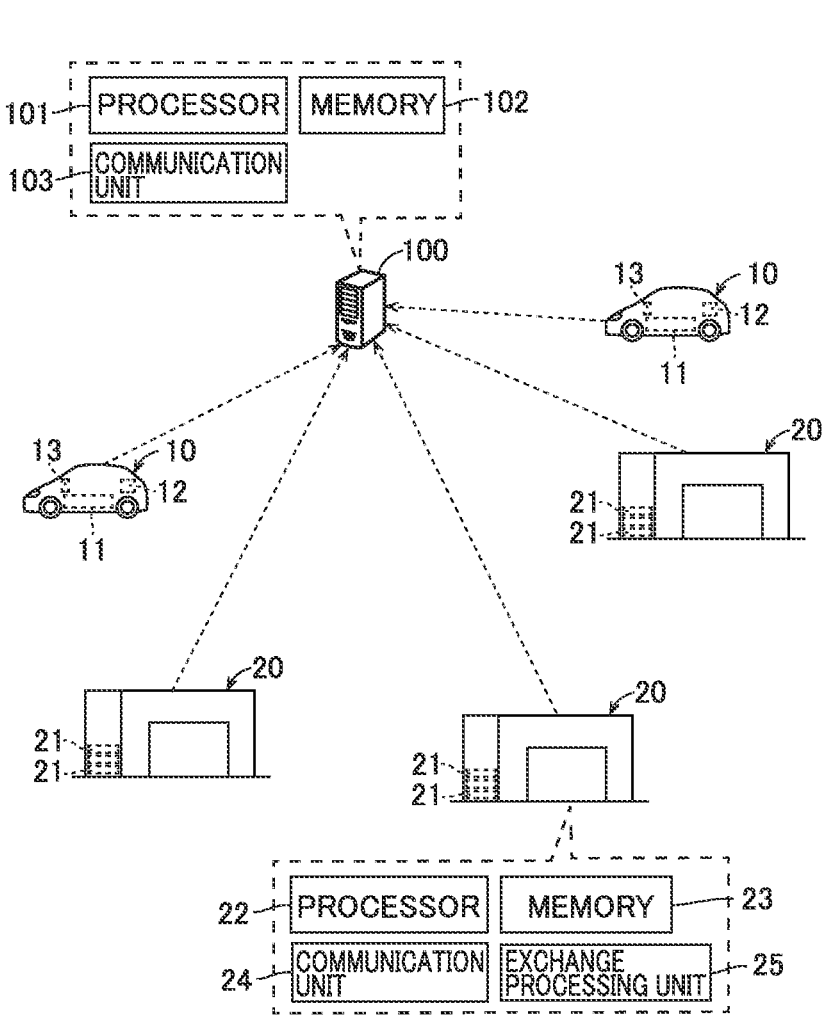
FIG. 1 is a diagram illustrating a configuration of a battery exchange system according to an embodiment.

Hereinafter, an embodiment of the present disclosure will be described in detail with reference to the drawings. In the drawings, the same or corresponding parts will be denoted by the same reference signs, and description thereof will not be repeated.

FIG. 1 is a diagram illustrating a configuration of a battery exchange system 1 according to the present embodiment. Battery exchange system 1 includes a server 100, a plurality of electrically powered vehicles 10, and a plurality of battery stations 20. Note that battery exchange system 1 and battery stations 20 are examples of the "battery exchange system" and the "battery exchange station" of the present disclosure, respectively. Also, server 100 is an example of the "control device" of the present disclosure.

Each electrically powered vehicle 10 includes a battery 11, a communicator 12, a car navigation system 13. Battery 11 supplies power to various electric devices such as a traveling motor, which is not illustrated, in electrically powered vehicle 10. Note that battery 11 and car navigation system 13 are examples of the "first battery" and the "display unit" of the present disclosure, respectively.

Communicator 12 of electrically powered vehicle 10 communicates with a communication unit 103 of server 100, which will be described later. Electrically powered vehicle 10 transmits position information of electrically powered vehicle 10 itself. SOC information, and the like to server 100 through communicator 12. Note that the information may be transmitted to server 100 through a mobile terminal or the like that the user of electrically powered vehicle 10 owns.

Electrically powered vehicle 10 includes, for example, a plug-in hybrid electrically powered vehicle (PHEV), a battery electrically powered vehicle (BEV), and a fuel cell electrically powered vehicle (FCEV). Communicator 12 of electrically powered vehicle 10 may include a data communication module (DCM) or may include a communication I/F compatible with a 5th generation mobile communication system (5G).

Each of plurality of battery stations 20 includes a plurality of batteries 21 that are replaceable with battery 11. Inside battery station 20, battery 11 of electrically powered vehicle 10 and batteries 21 are exchanged. Note that batteries 21 are an example of the "second battery" of the present disclosure.

Also, battery station 20 includes a processor 22, a memory 23, a communication unit 24, and an exchange processing unit 25. Exchange processing unit 25 executes processing of exchanging battery 11 with batteries 21. Processor 22 controls exchange processing unit 25.

Memory 23 stores, in addition to a program executed by processor 22, information used by the program (for example, maps, numerical expressions, and various parameters).

Communication unit 24 of each of plurality of battery stations 20 communicates with communication unit 103 of server 100. Communication unit 103 of server 100 acquires information on the SOC of batteries 21 stored in battery station 20, battery exchange booking information (information on the number of booking persons) in battery station 20, and the like from communication unit 24 of each of plurality of battery stations 20.

Server 100 includes a processor 101, a memory 102, and a communication unit 103. Processor 101 controls communication unit 103. Memory 102 stores, in addition to a program executed by processor 101, information used by the program (for example, maps, numerical expressions, and various parameters).

Memory 102 stores various kinds of position information of plurality of battery stations 20. Note that the position information may be transmitted from each of plurality of battery stations 20.

Here, according to a conventional system, there may be a case where it is difficult for an electrically powered vehicle to reach a destination depending on an SOC of a battery mounted in the electrically powered vehicle at a battery station. It is desirable to prevent the difficulty in reaching the destination due to shortage of the SOC of the electrically powered vehicle after battery exchange at the battery station.

Thus, in the present embodiment, processor 101 searches for battery stations 20 in which batteries 21 with an SOC that is a predetermined threshold value or more are stored, by using the information on the SOC of batteries 21. Specific description will be given with reference to the sequence diagram in FIG. 2. In regard to the above predetermined threshold value, detailed description will be given below. Note that the above predetermined threshold value is an example of the "predetermined value", the "SOC required to reach the destination", and the "total value" of the present disclosure.

(Sequence Control of Battery Exchange System)

Figure 2:
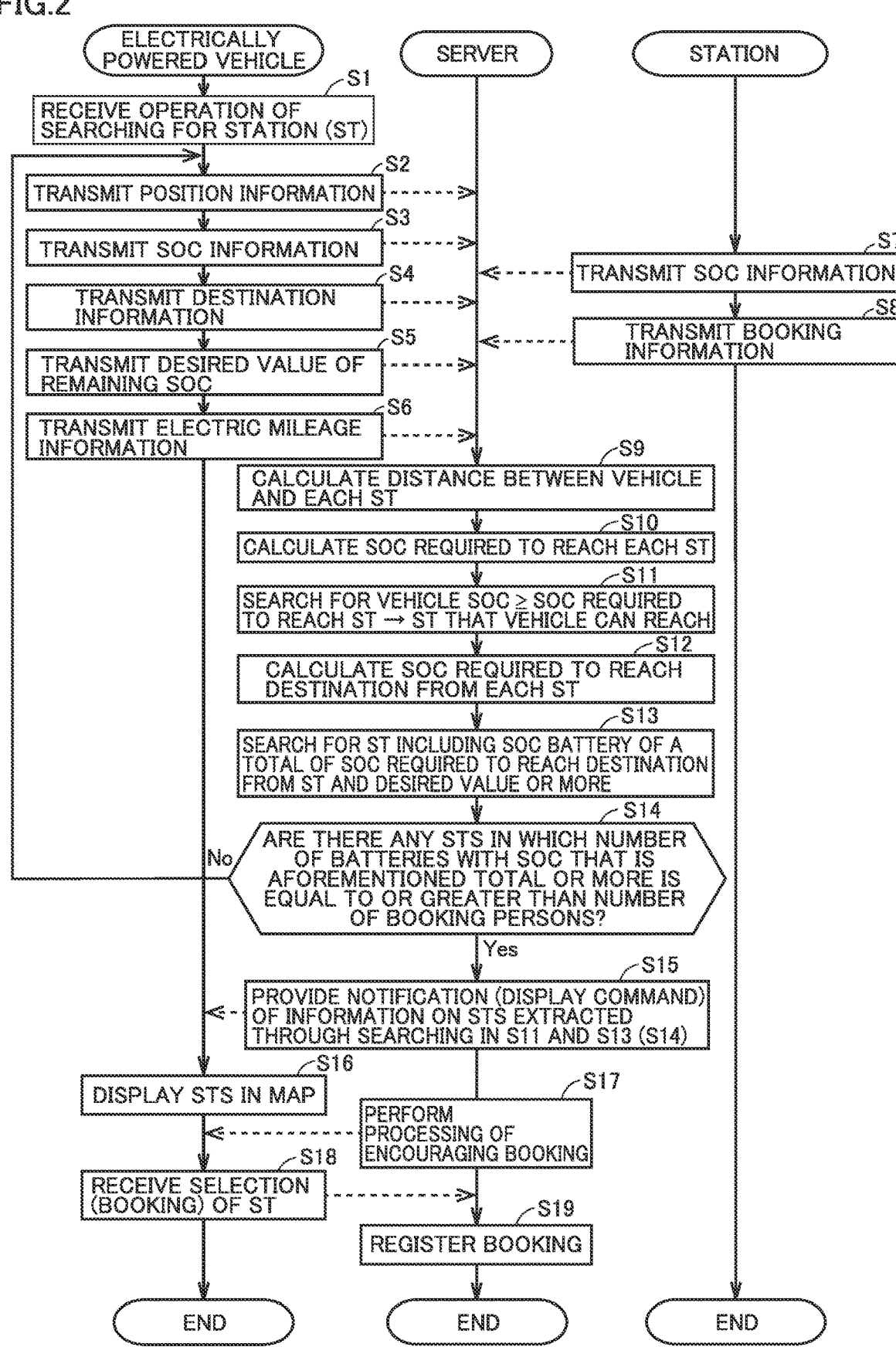
FIG. 2 is a sequence diagram of the battery exchange system according to the embodiment.

Sequence control of battery exchange system 1 will be described with reference to FIG. 2. Note that the sequence control illustrated in FIG. 2 is an example, and the sequence control is not limited thereto.

Figure 3:
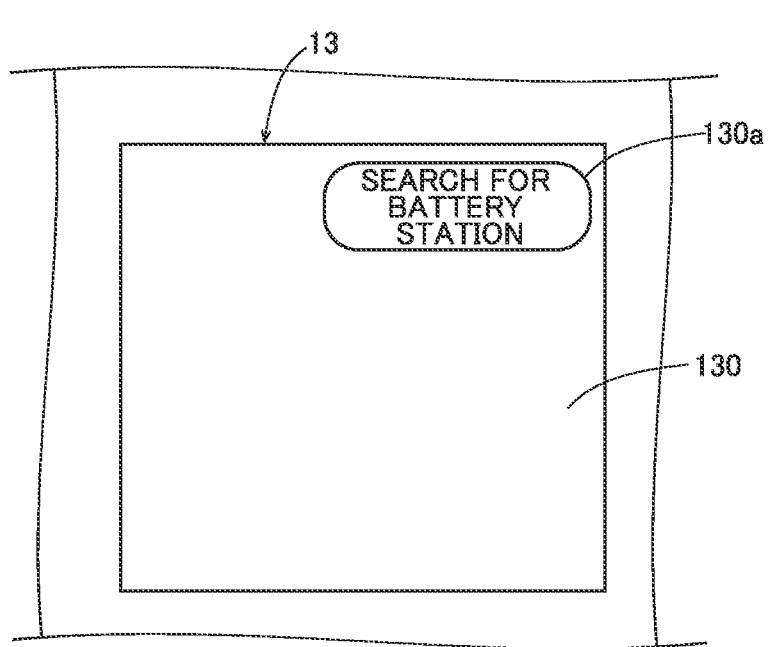
FIG. 3 is a diagram illustrating a first screen of a car navigation according to the embodiment.

In Step S1, an operation of searching for battery stations 20 is received by electrically powered vehicle 10 on the basis of user's selection of a button 130a (see FIG. 3) displayed on a screen 130 of car navigation system 13.

In Step S2, electrically powered vehicle 10 transmits position information of electrically powered vehicle 10 itself to communication unit 103 of server 100 through communicator 12. As a result, server 100 acquires the position information of electrically powered vehicle 10.

In Step S3, electrically powered vehicle 10 transmits information on the SOC of battery 11 of electrically powered vehicle 10 itself to communication unit 103 of server 100 through communicator 12. As a result, server 100 acquires the information on the SOC of electrically powered vehicle 10.

In Step S4, electrically powered vehicle 10 transmits information on a destination of the user to communication unit 103 of server 100 through communicator 12. As a result, server 100 acquires the information on the destination of electrically powered vehicle 10.

In Step S5, electrically powered vehicle 10 transmits a desired value of the SOC remaining in battery 11 of electrically powered vehicle 10 at a timing when electrically powered vehicle 10 reaches the destination, through communicator 12. For example, the user may input the desired value on a screen displayed on car navigation system 13, which is not illustrated, by selecting button 130a. Note that the desired value is an example of the "desired value" of the present disclosure.

In Step S6, electrically powered vehicle 10 transmits information on electric mileage to communication unit 103 of server 100 through communicator 12 or the like. For example, electrically powered vehicle 10 transmits, to communication unit 103, information on an average value or the like of the power consumption amount in a past predetermined period (one week, for example) as the information on electric mileage. As a result, server 100 acquires the information on the electric mileage of electrically powered vehicle 10. Note that a catalogue value (designed value) of electric mileage in accordance with the model of electrically powered vehicle 10 may be used as the electric mileage of electrically powered vehicle 10.

Note that the processing in Steps S2 to S6 may be executed in any order. For example, the processing in Steps S2 to S6 may be performed at the same time. Also, information in Steps S2 to S6 may be transmitted from a smartphone or the like of the user to server 100.

In Step S7, communication unit 24 of each of plurality of battery stations 20 transmits the information on the SOC of batteries 21 stored in battery station 20 to communication unit 103 of server 100. As a result, server 100 acquires the information on the SOC of batteries 21 stored in each battery station 20.

In Step S8, communication unit 24 of each of plurality of battery stations 20 transmits battery exchange booking information of battery station 20 to communication unit 103 of server 100. As a result, server 100 acquires the battery exchange booking information of other electrically powered vehicles 10 (electrically powered vehicles 10 other than electrically powered vehicle 10 that has transmitted the various information to server 100 in Steps S2 to S6) at each of plurality of battery stations 20.

Note that the processing in Steps S7 and S8 may be executed in any order. For example, the processing in Steps S7 and S8 may be performed at the same time.

In Step S9, processor 101 calculates the distance between electrically powered vehicle 10 and each of plurality of battery stations 20. Specifically, processor 101 calculates the distance on the basis of the position information of electrically powered vehicle 10 acquired in the processing in Step S2 and the position information of each of plurality of battery stations 20 stored in memory 102.

In Step S10, processor 101 calculates the SOC required by the electrically powered vehicle 10 to reach each of plurality of battery stations 20. Specifically, processor 101 calculates the SOC required by electrically powered vehicle 10 to reach each of plurality of battery stations 20 on the basis of the information on the distance calculated in Step S9 and the information on the electric mileage of electrically powered vehicle 10 acquired in the processing in Step S6.

In Step S11, processor 101 searches for battery stations 20 that electrically powered vehicle 10 can reach by using the information on the SOC (the SOC required to reach battery station 20) calculated in Step S10 and the information on the SOC of battery 11 acquired in the processing in Step S3. Specifically, processor 101 searches for battery stations 20 with an SOC of batteries 11 that is the SOC calculated in Step S10 or more. Note that Step S11 is an example of the "first searching" of the present disclosure.

In Step S12, processor 101 calculates an SOC required to reach the destination from each of plurality of battery stations 20. Specifically, processor 101 calculates the distance between each battery station 20 and the destination by using the position information of each battery station 20 and the information on the destination acquired in the processing in Step S4. Then, processor 101 calculates an SOC required to reach the destination from each battery station 20 by using the information on the distance between each battery station 20 and the destination and the information on the electric mileage of electrically powered vehicle 10.

In Step S13, processor 101 searches for battery stations 20 in which batteries 21 charged to a total value of the SOC (SOC calculated in Step S13) required to reach the destination from battery stations 20 and the desired value acquired in the processing in Step S5 or more are stored. Note that the total value is an example of the "predetermined value" of the present disclosure.

In Step S14, processor 101 searches for the battery stations in which the number of batteries 21 with an SOC that is the total value or more is larger than the number of other electrically powered vehicles 10 booking battery stations 20. Specifically, processor 101 determines whether or not the number of aforementioned batteries 21 is larger than the number of other electrically powered vehicles 10 at each battery station 20, by using the search result in Step S13 and the booking information acquired in the processing in Step S8. In a case where there are battery stations 20 in which the number of aforementioned batteries 21 is larger than the number of other electrically powered vehicles 10 (in a case of Yes in S14), the processing proceeds to Step S15. In a case where there are no battery stations 20 in which the number of aforementioned batteries 21 is larger than the number of other electrically powered vehicles 10 (in a case of No in S14), the processing returns to Step S2. Note that Steps S13 and S14 are examples of the "second searching" of the present disclosure.

In Step S15, the user of electrically powered vehicle 10 is notified of information on battery stations 20 extracted through the searching in Step S11 and the searching in Step S13 (S14). Specifically, the user is notified of the information on battery stations 20, which electrically powered vehicle 10 can reach, in which the number of batteries 21 with the SOC that is the total value or more is the number of bookings or more. At this time, a display command for displaying the information on corresponding battery stations 20 on car navigation system 13 is transmitted to electrically powered vehicle 10. Note that Step S15 is an example of the "notifying of the user" of the present disclosure.

Figure 4:
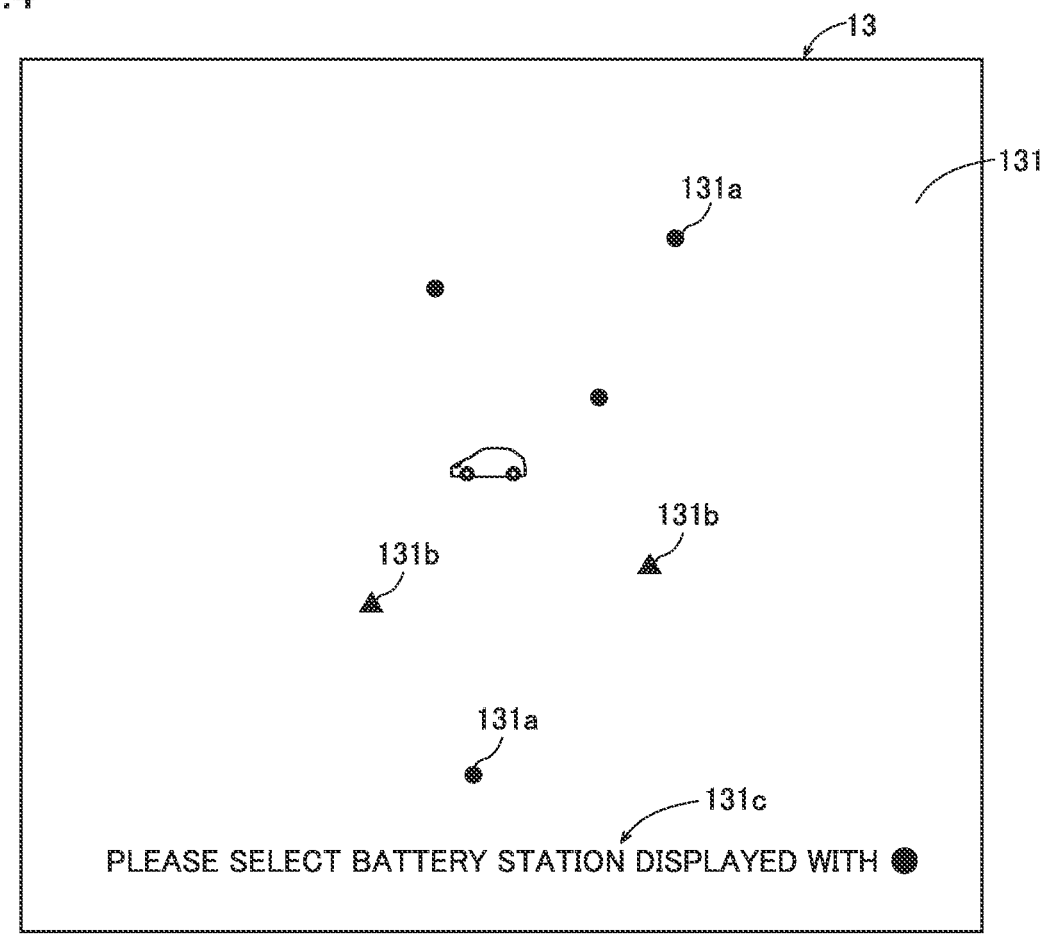
FIG. 4 is a diagram illustrating a second screen of the car navigation according to the embodiment.

In Step S16, electrically powered vehicle 10 displays a screen 131 illustrated in FIG. 4 on car navigation system 13 on the basis of the display command acquired in the processing in Step S15. Specifically, the positions of battery stations 20 provided through the notification in Step S15 are displayed in a first form (see circles 131a in FIG. 4) on screen 131. On the other hand, the positions of battery stations 20 that are not provided through the notification in Step S15 are displayed in a second form (see triangles 131b in FIG. 4) on screen 131. Note that setting may be made such that circles 131a are selectable while triangles 131b are not selectable.

In Step S17, processor 101 performs processing of encouraging the user of electrically powered vehicle 10 to book battery stations 20 provided through the notification in the processing in Step S15. Specifically, the processor 101 performs processing (transmission of a display command) of displaying a message 131c for encouraging the user to book battery stations 20 provided through the notification in the processing in Step S15 on screen 131 as illustrated in FIG. 4.

In Step S18, electrically powered vehicle 10 receives a selection operation (an operation of booking) a battery station 20 on screen 131. Specifically, booking of a battery station 20 corresponding to a touched circle 131a is received by the user touching any of circles 131a on screen 131.

In Step S19, processor 101 registers the booking of battery station 20 for which booking has been received in Step S18.

As described above, according to the embodiment, the user of electrically powered vehicle 10 is notified of the information on battery stations 20 extracted in Step S11 of searching for battery stations 20 that electrically powered vehicle 10 can reach and Step S13 (S14) of searching for battery stations 20 in which the batteries 21 with a larger SOC than the total value (the SOC required to reach the destination from battery stations 20+the desired value regarding to the remaining amount of SOC) are stored. It is thus possible to prevent a difficulty in reaching the destination due to shortage of the SOC of electrically powered vehicle 10. Furthermore, since the SOC is prevented from dropping below the desired value, it is possible to prevent a difficulty in moving due to shortage of the SOC after electrically powered vehicle 10 reaches the destination.

Figure 5:
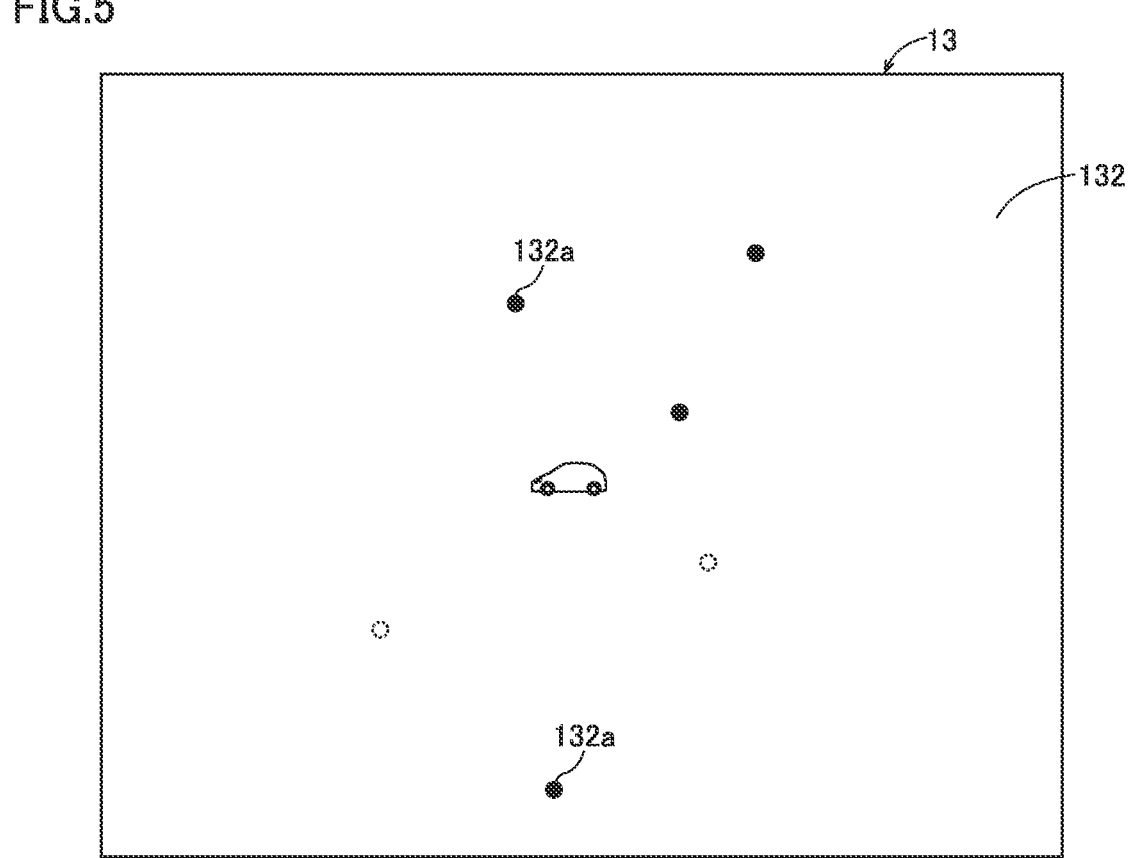
FIG. 5 is a diagram illustrating a screen of a car navigation according to a modification of the embodiment.

Although the example in which battery stations 20 that have been extracted and battery stations 20 that have not been extracted are displayed in mutually different forms has been described in the above embodiment, the present disclosure is not limited thereto. For example, processor 101 may cause car navigation system 13 to display a screen 132 illustrated in FIG. 5. On screen 132, battery stations 20 extracted in the processing in Steps S11 and S13 (S14) are displayed (see circles 132a in FIG. 5) in a state where battery stations 20 that have not been extracted in the processing in Steps S11 and S13 (S14) are not displayed (see the circles of the dashed lines in FIG. 5). Note that although the positions of battery stations 20 that are not displayed are illustrated by the dashed lines in FIG. 5 for easy understanding, the dashed lines are not displayed in practice.

Figure 6:
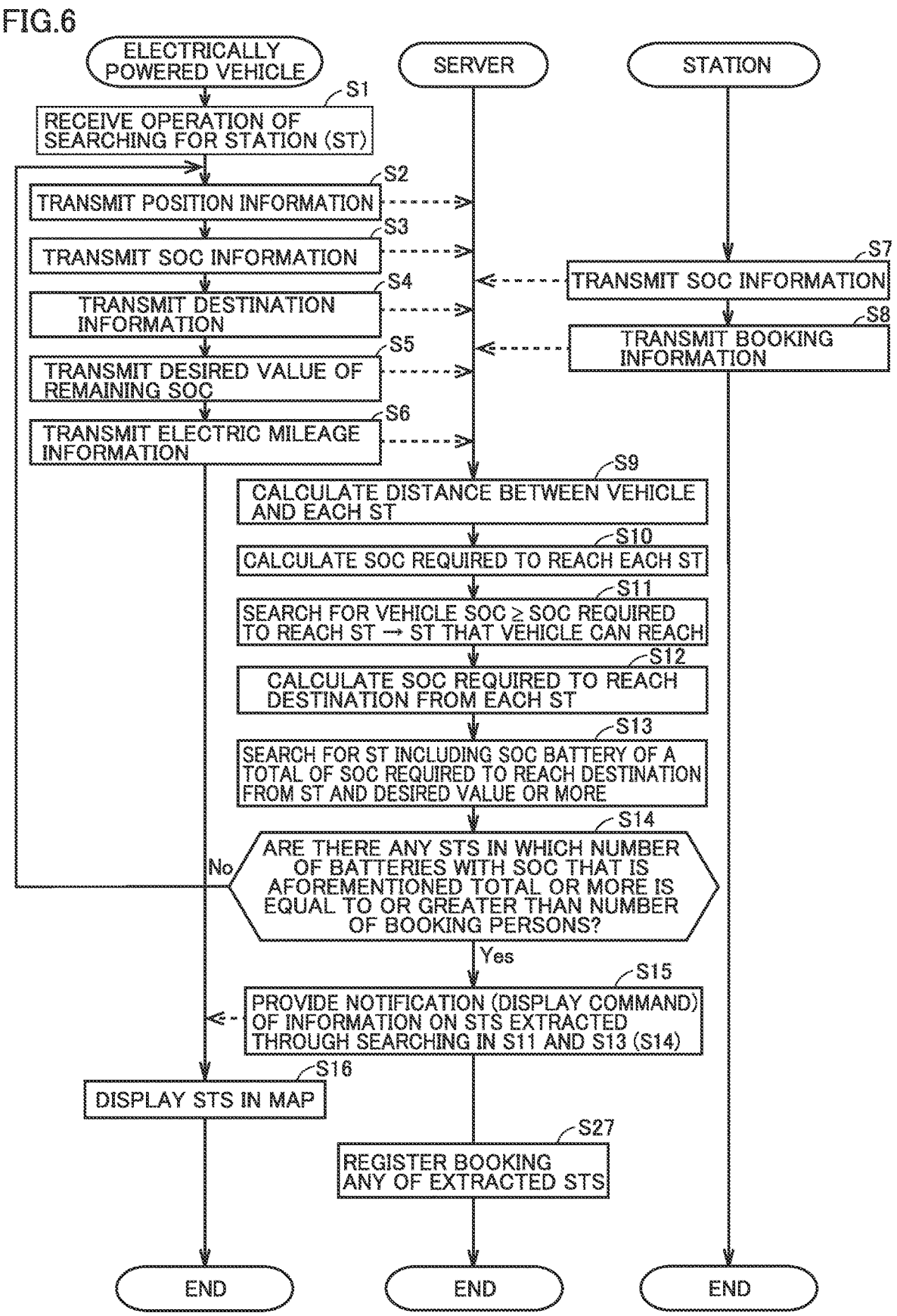
FIG. 6 is a sequence diagram of a battery exchange system according to a modification of the embodiment.

Also, although the example in which processor 101 performs the processing of encouraging the user to book battery station 20 has been described in the embodiment, the present disclosure is not limited thereto. For example, processor 101 may select any one of battery stations 20 extracted through the search in Steps S11 and S13 (S14) and book selected battery station 20 as in Step S27 illustrated in FIG. 6. Note that processor 101 may select battery station 20 provided at the closest location from electrically powered vehicle 10 from among plurality of extracted battery stations 20, for example. Note that the steps of the same processing as that in the embodiment are denoted by the same reference signs in FIG. 6.

In addition, although the example in which battery stations 20 storing batteries 21 charged to a total value of the SOC required by electrically powered vehicle 10 to reach the destination from battery stations 20 and the desired value regarding the remaining amount of the SOC of electrically powered vehicle 10 or more are searched for has been described in the embodiment, the present disclosure is not limited thereto. Battery stations 20 storing batteries 21 charged to the SOC required by electrically powered vehicle 10 to reach the destination from battery stations 20 or more may be searched for. Also, battery stations 20 storing batteries 21 charged to a predetermined SOC (80%, for example) set in advance or more may be searched for.

Although the present embodiment has been described and illustrated, it should be understood that the embodiment disclosed herein is by way of illustration and example only and is not to be taken by way of limitation in all respects. The scope of the present disclosure is indicated by the appended claims, and all modifications within meaning and a scope equivalent to those of the claims are intended to be included therein.

What is claimed is:

1. A battery exchange guiding method comprising:

acquiring information on an SOC of a first battery mounted in an electrically powered vehicle, the electrically powered vehicle including a car navigation system;

acquiring information on an SOC of a second battery stored in at least one battery exchange station;

calculating a distance between the electrically powered vehicle and the battery exchange station;

first searching for the battery exchange station that the electrically powered vehicle is able to reach, by using information on the distance and the information on the SOC of the first battery;

second searching for the battery exchange station in which the second battery with a larger SOC than a predetermined value is stored, by using the information on the SOC of the second battery; and notifying a user of the electrically powered vehicle of information on the battery exchange station extracted through the first searching and the second searching, the notifying the user includes (i) controlling the car navigation system to display, in a first shaped icon, a position of the battery exchange station extracted through the first searching and the second searching and (ii) controlling the car navigation system to display, in a second shaped icon that is different from the first shaped icon, a position of the battery exchange station that is not extracted in the first searching and the second searching.

2. The battery exchange guiding method according to claim 1, further comprising:

acquiring information on a destination of the electrically powered vehicle; and calculating an SOC required to reach the destination from the battery exchange station, wherein the second searching includes searching for the battery exchange station in which the second battery is stored, the second battery being charged to more than or equal to the SOC required to reach the destination from the battery exchange station.

3. The battery exchange guiding method according to claim 2, further comprising:

acquiring a desired value of the user on an SOC of the electrically powered vehicle which remains at a timing when the electrically powered vehicle reaches the destination, wherein the second searching includes searching for the battery exchange station in which the second battery is stored, the second battery being charged to more than or equal to a total value of the SOC required to reach the destination from the battery exchange station and the desired value.

4. The battery exchange guiding method according to claim 1, further comprising:

acquiring booking information of other electrically powered vehicles at the battery exchange station, wherein the second searching includes searching for the battery exchange station in which the number of the second batteries with the SOC that is the predetermined value or more is larger than the number of the other electrically powered vehicles booking the battery exchange station.

5. The battery exchange guiding method according to claim 1, wherein the notifying the user includes controlling the car navigation system to display the position of the battery exchange station extracted through the first searching and the second searching in a state where the car navigation system does not display the position of the battery exchange station that is not extracted in the first searching and the second searching.

6. The battery exchange guiding method according to claim 1, further comprising:

encouraging the user to book the battery exchange station extracted through the first searching and the second searching; or booking the battery exchange station extracted through the first searching and the second searching.

7. A battery exchange system comprising:

an electrically powered vehicle in which a first battery is mounted, the electrically powered vehicle including a car navigation system;

at least one battery exchange station in which a second battery is stored; and a control device that acquires information on an SOC of the first battery and information on an SOC of the second battery, wherein the control device;

calculates a distance between the electrically powered vehicle and the battery exchange station, executes first search of searching for the battery exchange station that the electrically powered vehicle is able to reach, by using information on the distance and the information on the SOC of the first battery, executes second search of searching for the battery exchange station in which the second battery with a larger SOC than a predetermined value is stored, by using information on the SOC of the second battery, and performs control of notifying a user of the electrically powered vehicle of information on the battery exchange station extracted through the first search and the second search, the notifying the user includes (i) controlling the car navigation system to display, in a first shaped icon, a position of the battery exchange station extracted through the first searching and the second searching and (ii) controlling the car navigation system to display, in a second shaped icon that is different from the first shaped icon, a position of the battery exchange station that is not extracted in the first searching and the second searching.

* * * * *